United States Patent [19]

Weise

[11] Patent Number: 4,784,443

[45] Date of Patent: Nov. 15, 1988

[54] METHOD AND CIRCUIT CONFIGURATION FOR MONITORING AND CONTROLLING A SLIP-CONTROLLED BRAKE SYSTEM

[75] Inventor: Lutz Weise, Mainz, Fed. Rep. of Germany

[73] Assignee: Alfred Teves GmbH, am Main, Fed. Rep. of Germany

[21] Appl. No.: 63,729

[22] Filed: Jun. 15, 1987

Related U.S. Application Data

[62] Division of Ser. No. 763,801, Aug. 7, 1985, abandoned.

[30] Foreign Application Priority Data

Aug. 8, 1984 [DE] Fed. Rep. of Germany ....... 3429156

[51] Int. Cl.$^4$ .............................................. B60T 8/02
[52] U.S. Cl. ........................................ 303/96; 303/106
[58] Field of Search ............... 303/96, 111, 110, 105, 303/106, 100; 188/181 A, 181 C; 340/52 B

[56] References Cited

U.S. PATENT DOCUMENTS

| | | | |
|---|---|---|---|
| 3,620,577 | 11/1971 | Neisch | 303/96 |
| 3,630,579 | 12/1971 | Rodi | 303/105 |
| 3,702,206 | 6/1971 | Sweet | 303/111 |
| 3,740,103 | 6/1973 | Sweet et al. | 303/110 |
| 3,797,893 | 3/1974 | Burckhardt et al. | 303/92 |
| 3,874,743 | 4/1975 | Fleischer et al. | 303/92 |
| 3,893,535 | 3/1972 | Burckhardt et al. | 303/96 |
| 3,953,080 | 4/1976 | Bremer | 303/92 |
| 4,061,402 | 12/1977 | Peterson et al. | 340/52 B |
| 4,098,542 | 7/1978 | Rajput et al. | 303/92 |
| 4,161,717 | 7/1979 | Hoover et al. | 303/92 |
| 4,484,280 | 11/1984 | Brugger et al. | 303/96 |
| 4,494,801 | 9/1982 | Ohmori et al. | 303/111 |
| 4,523,791 | 6/1985 | Belart et al. | 303/100 |
| 4,555,144 | 11/1985 | Belart et al. | 303/114 |

FOREIGN PATENT DOCUMENTS

| | | |
|---|---|---|
| 2251472 | 4/1974 | Fed. Rep. of Germany . |
| 2705737 | 8/1978 | Fed. Rep. of Germany . |
| 2916076 | 10/1979 | Fed. Rep. of Germany . |
| 2061432 | 5/1981 | United Kingdom . |
| 2119043 | 11/1983 | United Kingdom . |
| 2135413 | 8/1984 | United Kingdom . |

*Primary Examiner*—John W. Caldwell, Sr.
*Assistant Examiner*—Alvin Oberley
*Attorney, Agent, or Firm*—James B. Raden

[57] ABSTRACT

A method and apparatus for monitoring and controlling a slip-controlled brake system wherein the wheel rotational behavior is ascertained and wherein, on detection of a tendency to lock, the braking pressure in the wheel brakes is kept constant or varied temporarily. The slip control of the front wheels is deactivated on the occurrence of a malfunction of the slip control unit which would result in locking or an inadmissible strong tendency to lock of a first rear wheel and deactivating or maintaining the slip control of the front wheels as a function of the wheel rotational behavior of the second rear wheel.

3 Claims, 1 Drawing Sheet

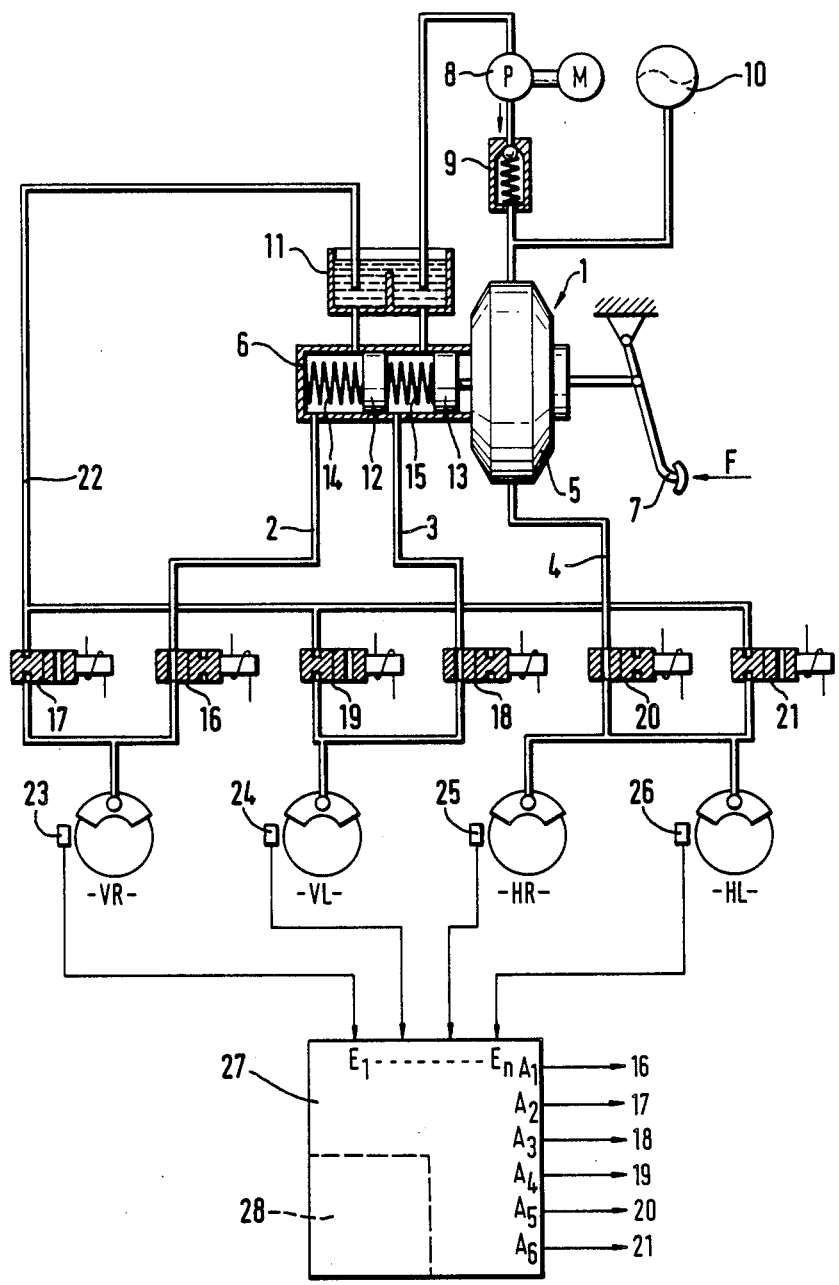

METHOD AND CIRCUIT CONFIGURATION FOR MONITORING AND CONTROLLING A SLIP-CONTROLLED BRAKE SYSTEM

This application is a division of application Ser. No. 763,801, filed Aug. 7, 1985, now abandoned.

BACKGROUND OF THE INVENTION

The present invention relates to a method for monitoring and controlling a slip-controlled brake system for automotive vehicles. The wheel rotational behavior is sensed and, on detection of an imminent locked condition, the braking pressure in the wheel brakes of the wheel concerned or in the wheel group to which the wheel tending to lock belongs will be temporarily kept constant or varied. That is, decreased and, if necessary, re-increased. The present invention also provides circuit configurations for implementing these methods.

As is known, slip-controlled brake systems prevent locking of the wheels even under unfavorable road conditions, in particular on snowy and icy roads, and upon panic stops by way of temporarily reducing the braking pressure or keeping it constant. These systems maintain the driving stability and the steerability of the vehicle, while attaining a short stopping distance, since the braking pressure is reduced just enough to prevent locking. According to the inherent principle, the braking pressure variation is temporarily kept constant or even decreased, on commencement of the slip control, as a function of the wheel rotational behavior, the transmissible brake torques, etc. Therefore, malfunctions of the controller will not only defeat the effect of the slip control, but may also cause dangerous situations, for instance due to an excessive reduction of the braking pressure, slow reaction, etc.

Arrangements and circuit configurations for monitoring slip-controlled brake systems are known. A minimum requirement to be fulfilled by these arrangements is to bring about at least that condition which would prevail without slip control upon the occurrence of an error. To this end, the slip control will be deactivated on detection of an error, and this condition will be signalled to the driver. In hydraulic brake slip control apparatus it is known to monitor the pressure in the hydraulic source and the fluid status or the fluid quantity in the hydraulic system and to partially or entirely deactivate the apparatus on the detection of defects, for example, by closing the pressure-reducing valves or by not releasing them (German patent application Nos. 32 32 051.5 and 32 32 052.3 which correspond to U.S. Pat. Nos. 4,523,791 and 4,555,144 respectively).

It is likewise known to monitor the valves inserted into the pressure fluid conduits from the braking pressure generator to the wheel brakes and from the wheel brake to a supply reservoir, which to control the constant braking pressure and the pressure reduction. The circuit configuration as disclosed in German patent specification No. 22 51 472 controls the mechanical movement of the solenoid valve armature from the measurement of the variation of the valve current. However, the valve monitoring is very complicated and relatively unreliable because the known circuit configurations only detect errors of a certain kind.

It is, therefore, an object of the present invention to increase the safety and the reliability of slip-controlled brake systems and to eliminate the danger of skidding which is caused by overbraking of the rear wheels as a result of a defective control. That is, while brake systems without slip control are devised such that the rear wheels come to a standstill only after the front wheels have locked, it is easily possible (for example, when a rear-wheel pressure-reducing valve fails or is jammed) that only the rear wheels will lock, but that the braking pressure at the front wheels will continue to be controlled. This driving condition would be extremely critical, because there would be a high risk of skidding for the vehicle due to the minor lateral guidance of the stationary rear wheels.

SUMMARY OF THE INVENTION

This object is achieved by a method and a circuit configuration of the type described with the improvement wherein upon the occurrence of a malfunction of the slip control which results in locking, or a great tendency to lock, of a rear wheel, the slip control of the front wheels will be deactivated for the duration of the malfunction or until termination of the then current braking action. In this arrangement, response of the monitoring can be dependent on deceleration threshold values or slip threshold values and/or on time criteria, for example, the duration of the deceleration period.

Another solution is provided by the present invention is that, upon the occurrence of a malfunction which results in locking, or a great tendency to lock, of a rear wheel, the slip control of the front wheels is maintained or deactivated depending on the wheel rotational behavior of the second rear wheel. The present invention also provides that the slip control of the front wheel can be deactivated as soon as the slip of the second rear wheel exceeds a predetermined threshold value. Similarly, the slip control of the front wheels (VL, VR) can be deactivated as soon as the deceleration of the second rear wheel (HL, HR) exceeds a predetermined deceleration threshold value. Finally, the slip threshold values and/or the deceleration threshold values can be varied in dependence on the vehicle speed or a reference value corresponding to the vehicle speed.

Hence, according to the present invention, the vehicle equipped with the slip-controlled brake system is protected against defects and malfunctions of different types, namely against mechanical and electrical defects which could result in overbraking of the rear axle and continuation of the control of the front axle and, thereby, could incur the danger of skidding. The inventive arrangements are also suitable for brake slip control apparatus, wherein the braking pressure in the two rear wheels is controlled synchronously by way of one joint pair of inlet and outlet valves, the braking pressure being chosen by the control according to the 'select-low' selection criterion and hence being determined by the rear wheel with the worst road contact. Without the inventive improvement, false actuation or sticking of the joint outlet valve could have as a consequence simultaneous locking of both rear wheels.

BRIEF DESCRIPTION OF THE DRAWING

Further features, advantages and applications of the present invention are set forth in the following description when taken in conjunction with the accompanying drawing wherein the single FIGURE provides a schematically simplified hydraulic and electric wiring diagram of a slip-controlled brake system in accordance with the present invention.

DETAILED DESCRIPTION

As is shown in the drawing, the apparatus comprises a braking pressure generator 1 to which three hydraulically isolated pressure fluid circuits 2, 3, 4 are connected. The drawing illustrates a hydraulic brake power booster 5 which is structurally united with a tandem master cylinder 6. In the normal case, such a known device causes a braking pressure to develop in the individual circuits 2, 3, 4 which is approximately proportional to the pedal force F acting upon a brake pedal 7. The auxiliary energy for boosting the force F is taken from an auxiliary energy source which substantially comprises a hydraulic pump 8 with the associated non-return valve 9 and of a pressure accumulator 10. The suction side of the pump 8 is connected with a compensating and supply reservoir 11 which, in addition, feeds the master cylinder 6 with pressure fluid. The working pistons 12, 13 of the tandem master cylinder 6 and the associated restoring springs 14, 15 are also shown in the drawing.

In the embodiment depicted herein, the two front wheels VR, VL are each connected to a pressure fluid circuit 2, 3 of the master cylinder 6, while the two rear wheels HR, HL communicate with the circuit 4 of the brake power booster 5. Each pressure fluid circuit is furnished with one pair of inlet and outlet valved 16, 17; 18,19; 20, 21 enabling control of the braking pressure in the wheel brakes of the front wheels VR, VL individually and of the rear wheels HR, HL concurrently.

All valves are designed as electromagnetically actuatable two-way/two-position directional control valves, the inlet valves 16, 18, 20 thereof being opened in their initial position, (as long as they are not energized) while the outlet valves 17, 19, 21 are closed in their initial position and will admit pressure fluid to discharge by way of the return line 22 into the supply reservoir 11 only after being electromagnetically actuated or changed over, respectively. Apparatus of this type contain valve-controlled pressure fluid conduits (not illustrated herein) which serve to feed pressure fluid out of the auxiliary energy supply system 8, 9, 10 into the static circuits 2, 3. This is necessary in order to compensate the quantity of pressure fluid which flows off by way of phase of pressure reduction.

Additionally, each vehicle wheel VR, VL, HR, HL is equipped with a sensor 23, 24, 25, 26, for example an inductive pick-up for measuring data, for the determination of the wheel rotational behavior. This information is supplied in the form of electric signals by way of the signal lines to the electronic circuits comprised in the block 27, wherein the signals are conditioned and logically combined. In response to these sensor signals which prevail at the inlets $E_1$-$E_n$, braking pressure control signals are generated in the block 27 and are supplied by way of the outlet $A_1$-$A_6$ to the two-way/two-position directional control valves 16 to 21 which serve as braking pressure modulators herein and which permit modulation of the braking pressure in the wheel brakes of the individual wheels. The circuit in the block 27 may be provided as hard-wired electronic logic circuitry, but also as programmed circuits, for example as microcomputers.

A component part 28 of the electronic circuitry or of the microcomputer, which part is represented symbolically by the dotted division, serves according to the invention to monitor and to control the brake-slip-controlled brake system; again, these functions may likewise be realized by program steps. This is because the wheel rotational behavior which is monitored by the sensors 23 to 26 enables recognition of malfunctions of the circuitry or of the valves which may result in locking of the rear wheels HR, HL and thus may endanger the driving stability of the vehicle. As soon as the slip and/or the deceleration of one or even of both of the vehicle wheels exceed(s) values which would not be allowed to occur with an intact control and a sufficiently quick braking pressure reduction, the monitoring circuit 28 will evaluate this as a defect and instantaneously will deactivate the slip control of the front wheels VR, VL. For this reason, there will be development of braking pressure in the wheel brakes of the front wheels, which causes the front wheels, VR, VL to lock. The vehicle loses its steerability thereby, but the danger of skidding which emanates from the locking rear wheels which receive very little lateral guidance forces will be eliminated or reduced to a minimum.

The duration and the type of intervention in the control are dependent on various parameters. If one rear wheel is locking, while the other one is stably running and continues to be able to receive high lateral guidance forces, it is expedient to put the control of the front wheels out of service or to deactivate it after termination of the braking action at the earliest. If the limit of wheel lock of one or both of the rear wheels is exceeded only once and for a very short interval, the front-wheel control should only be deactivated temporarily, because the defect (for example, caused by an impeded valve) obviously was of a transitory nature, and hence there is no need to defeat or disable full control and the steerability of the front wheels. Of course, other errors which, due to their duration and their character, point to a defect will result in deactivation of the control and to signal the defect until the error disappears or until the apparatus is checked or repaired.

Furthermore, it is expedient and advantageous in many embodiments of the present invention to vary the thresholds of response of the monitoring circuit 28, in particular the slip threshold values and the acceleration threshold values as a function of the vehicle speed. For example, at very low speeds under unfavorable conditions, there may occur a short standstill of one or both of the rear wheels that is not dangerous. According to one embodiment of the present invention, the described monitoring and the deactivation of the front-wheel control will be disabled when the first or the second of the rear wheels is locking below a speed threshold of, for example, 15 to 20 kms per hour.

In lieu of individual sensors 25, 26 for the rear wheels, it is also possible to use a so-called mean value sensor such as, for example, at the shaft-drive. These sensors have the advantage that they can be used with a somewhat more sophisticated evaluation circuit to recognize from the variation of wheel rotation whether only one rear wheel or also the other rear wheel displays such a strong tendency to lock and that this indicates a defect in the rear-wheel control.

What is claimed is:

1. A method for monitoring and controlling a slip-controlled brake system for automotive vehicles having wheel means comprising front and rear wheels wherein the wheel rotational behavior is sensed, and wherein on detection of an imminent wheel locked condition, the braking pressure in the wheel brakes of the wheel means to which the wheel brakes of said wheels means in which a wheel tending to lock is a part will be temporarily controlled, said method comprising the steps of: detecting the occurrence of a malfunction of the slip control which has as a result an inadmissibly great tendency to lock of a first rear wheel and deactivating or maintaining the slip control of the front wheels as an independent function of the wheel rotational behavior of the second rear wheel wherein the slip control of the front wheels is deactivated as soon as the slip of the second rear wheel exceeds a predetermined threshold value.

2. A method as claimed in claim 1, wherein the slip control of the front wheels (VL, VR) is deactivated as soon as the deceleration of the second rear wheel (HL, HR) exceeds a predetermined deceleration threshold value.

3. A method as claimed in claim 2, wherein the slip threshold values and/or the deceleration threshold values are variable in dependence on the vehicle speed or a reference value corresponding to the vehicle speed.

* * * * *